United States Patent [19]  
Miyata et al.

[11] 4,085,088  
[45] Apr. 18, 1978

[54] FIRE-RETARDING THERMOPLASTIC RESIN COMPOSITION

[75] Inventors: Shigeo Miyata, Takamatsu; Toru Hirose, Ohkawa; Noriko Iizima, Takamatsu, all of Japan

[73] Assignee: Kyowa Chemical Industry Co., Ltd., Tokyo, Japan

[21] Appl. No.: 753,087

[22] Filed: Dec. 21, 1976

[30] Foreign Application Priority Data

Jan. 23, 1976 Japan .................................. 51-5903

[51] Int. Cl.$^2$ .............................................. C08K 3/22
[52] U.S. Cl. ............................. 260/45.7 R; 106/288 B
[58] Field of Search ................. 260/45.7 R; 106/288 B

[56] References Cited

U.S. PATENT DOCUMENTS

| | | | |
|---|---|---|---|
| 3,862,070 | 1/1975 | Fukushima et al. | 260/45.7 R X |
| 3,872,052 | 3/1975 | Fielding et al. | 106/288 B X |
| 3,931,095 | 1/1976 | Kondo et al. | 260/45.7 R X |

*Primary Examiner*—Sandra M. Person  
*Attorney, Agent, or Firm*—Wenderoth, Lind & Ponack

[57] ABSTRACT

A fire-retarding thermoplastic resin composition comprising (A) a thermoplastic resin, and (B) a fire-retarding amount of a hydrotalcite having a specific surface area, determined by the BET method, of not more than 30 m$^2$/g, the hydrotalcite being uncoated, or coated with an aqueous solution of an anionic surface active agent in a concentration of not more than 20 millimoles/liter in a thickness larger than a monolayer but up to a triple layer.

8 Claims, No Drawings

FIRE-RETARDING THERMOPLASTIC RESIN COMPOSITION

SUMMARY OF THE INVENTION

This invention relates to a fire-retarding thermoplastic resin composition containing hydrotalcite coated or uncoated with an anionic surface active agent as an inorganic fire retardant. More specifically, the invention relates to an inorganic fire retardant-containing a thermoplastic resin composition which is non-toxic and does not generate a hazardous or poisonous gas at the time of heat molding, and which can afford molded articles having a good appearance without a disadvantage of corroding the fabricating apparatus and other metallic equipment while retaining the serviceable properties of the thermoplastic resin.

In particular, the invention relates to a fire-retarding thermoplastic resin composition having the above described advantages, which comprises (A) a thermoplastic resin, and (B) a fire-retarding amount of a hydrotalcite having a specific surface area, determined by the BET method, of not more than 30 m$^2$/g, the hydrotalcite being uncoated or coated with an aqueous solution of an anionic surface active agent in a concentration of not more than 20 millimoles/liter in a thickness larger than a monolayer but up to a triple layer.

DESCRIPTION OF THE PRIOR ART

There hs been a general tendency toward a statutory control of plastic treatment for fire-retarding purposes, as in UL Standards in U.S.A., and the control has become increasingly rigorous. Various inorganic fire retardants have been utilized heretofore, but those presently recommended are fire retardants composed of antimony oxide and halogen compounds. Antimony oxide is relatively expensive and difficult to obtain and has toxicity. Furthermore, a halogen gas is generated during the fabrication of a resin containing such a fire retardant, and the toxicity and corrosive nature of the halogen gas poses a problem. For this reason, it has been desired to develop new fire retardants which can overcome these difficulties.

It is known on the other hand, that the addition of an inorganic filler to a thermoplastic resin generally enhances its dimensional stability, thermal stability and rigidity, but at the same time, results in a deterioration in impact strength and elongation and also in flowability and therefore in moldability, thus affording molded articles having a poor appearance.

BACKGROUND OF THE INVENTION

The present inventors worked on hydrotalcites over many years, and attempted to incorporate them in thermoplastic resins as fire retardants. In certain experiments, they incorporated hydrotalcites into polyolefins, but found that the compositions obtained had poor moldability and the molded articles suffer from deteriorated properties. For example, they found that when the hydrotalcite was added in an amount of at least about 40% by weight, which amount could achieve satisfactory self-extinguishing properties, the mechanical properties, especially impact strength and elongation, of molded articles obtained from the compositions were substantially deteriorated, and the flowability of the composition at the time of molding became extremely poor to render the molding operation extremely difficult and markedly reduce the molding efficiency. They also discovered that because the temperature at which the water of crystallization begins to be liberated is about 120° C., a small amount of water resulting at the time of molding causes flashes on the surface of the molded articles, and debases the commercial value of the molded articles.

On further work, they unexpectedly found that readily available hydrotalcites generally have a specific surface area, determined by the BET method, (to be referred to as a BET specific surface area) of at least about 50 m$^2$/g and strongly aggregated, but that the use of hydrotalcites having a BET specific surface area of not more than 30 m$^2$/g can obviate the above disadvantages, and can impart satisfactory fire retardancy to thermoplastic resins. It was also found that hydrotalcites having a BET specific surface area of not more than 30 m$^2$/g, preferably those having a BET specific surface area of not more than 20 m$^2$/g and a crystallite size, in the $<003>$ direction in the X-ray diffraction pattern, (to be referred to as a $<003>$ crystallite size) of at least 600 A, can be provided by a simple means.

Quite unexpectedly, the inventors found that the aforementioned disadvantages associated with the use of hydrotalcites having a BET specified surface area of at least about 50 m$^2$/g and a $<003>$ crystallite size of not more than about 300 A can be overcome completely by hydrotalcites which have, or are caused to have, a BET specific surface area of not more than 30 m$^2$/g.

The works of the inventors have revealed the following. The existing readily available hydrotalcites have a small crystallite size, and the crystal lattice has a great strain and strong aggregation occurs (to an extent of about 20 to 70 microns). Moreover because a number of small pores form in the aggregate, water will be adsorbed to these pores by a strong chemical adsorbing force. Furthermore, the smaller the crystallite size, the lower is the temperature at which the water of crystallization begins to be liberated. Thus, such a filler has poor dispersibility in resins, and deteriorates the flowability of a resin composition containing it. Moreover, water and water of crystallization are liberated at the time of molding to cause flashes on the molded products and debase their appearance. The filler also has poor affinity for resins, and voids occur in the interfaces between the filler and the resin, causing a substantial reduction in impact strength and elongation. It is presumed that the disadvantages of conventional resin compositions containing hydrotalcites are ascribable to these phenomena.

On the other hand, the hydrotalcites specified in the present invention which have a BET specific surface area of not more than 30 m$^2$/g, and preferably having a $<003>$ crystallite size of at least 600A have a small crystal lattice strain, and therefore, a small surface polarity, and their tendency to aggregate is greatly reduced. In addition, water of crystallization is structurally stable, and the temperature at which it begins to be liberated rises to about 180° to 200° C. It is probably for this reason that the above-mentioned defects of the readily available hydrotalcites having a BET specific surface area of at least about 50 m$^2$/g can be substantially avoided.

It has also been found that the use of hydrotalcites having a BET specific surface area of not more than 30 m$^2$/g, preferably not more than 20 m$^2$/g, coated with an aqueous solution of an anionic surface active agent in a concentration of not more than 20 millimoles/liter, having a thickness larger than a monolayer but up to a triple layer, preferably larger than a monolayer but up to a double layer, frequently brings about desirable improvements.

Accordingly, it is an object of this invention to provide an inorganic fire retardant-containing thermoplastic resin composition which is non-toxic and does not generate a hazardous or poisonous gas at the time of heat molding, and which can afford molded articles having a good appearance without the disadvantage of corroding the fabricating apparatus and other metallic equipment while retaining the practical properties of the thermoplastic resin.

The above and other objects and advantages of this invention will become more apparent from the following description.

DESCRIPTION OF THE PREFERRED EMBODIMENTS

The fire retardant used in the thermoplastic resin composition in accordance with this invention is a hydrotalcite having a BET specific surface area of not more than 30 m²/g, preferably not more than 20 l m²/g, more preferably also having a <003> crystallite size of at least 600 A, especially at least 1000 A. Such hydrotalcites can be distinguished from ordinary hydrotalcites having a BET specific surface area of at least about 50 m²/g. The ordinary hydrotalcites have a <003> crystallite size of not more than about 300 A.

Preferred species of the hydrotalcites used in this invention are compounds of the following formula

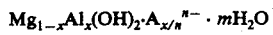

$$Mg_{1-x}Al_x(OH)_2 \cdot A_{x/n}{}^{n-} \cdot mH_2O$$

wherein x is a number of more than 0 but up to 0.5, $A^{n-}$ represents an anion having a valence of n, preferably a divalent anion such as $CO_3^{2-}$ or $SO_4^{2-}$, and m is a positive number.

The hydrotalcite used in this invention as an inorganic fire retardant can be incorporated in various thermoplastic synthetic resins, for example, styrene resins such as homo- or copolymer of styrene (e.g., polystyrene, or ABS resin), olefin resins such as homo- or copolymers of α-olefins (e.g., ethylene or propylene), polyester resins, polycarbonate resins, and blends of these resins. In particular, the hydrotalcites in accordance with this invention are conveniently used as inorganic fire retardants for non-polar or weakly polar resins.

If desired, the hydrotalcites used in this invention may be treated with an anionic surface active agent to form solid particles of hydrotalcite coated with the surfactant. This form is more preferred in using the hydrotalcites as a fire retardant for thermoplastic resins or water-soluble paints. The coating can be performed by contacting the hydrotalcite with anionic surfactants. For example, an aqueous solution of an anionic surfactant in a concentration of not more than 20 millimoles/liter is mixed with solid particles of hydrotalcite under conditions which ensure their intimate contact, for example, by agitating them sufficiently, or by hydrothermal treatment at 120° to 250° C. thereby to form a solid powder of hydrotalcite coated with the anionic surfactant. This contacting operation causes the surfactant to be chemically adsorbed on the surface of the solid particles of the hydrotalcite, and can lead to more improved properties when the hydrotalcite is incorporated in thermoplastic synthetic resins or water-soluble paints.

The amount of the anionic surfactant to be coated can be adjusted optionally. For example, an aqueous solution containing not more than 20 millimoles, e.g., about 5 millimoles to about 20 millimoles, per liter of water, of the surfactant is preferred. The amount of the anionic surfactant adsorbed to the solid particles of the hydrotalcite is such that a coating having a thickness larger than a monolayer but up to a triple layer, preferably larger than a monolayer but up to a double layer, can be formed. The amount (X in millimoles) required to coat the entire surface of the solid particles (1 gram) with a monolayer of the surfactant molecules can be calculated in accordance with the following equation.

$$X = Y/6.02 \times C \text{ (millimoles)}$$

wherein

C is the absolute value of the adsorption cross-sectional area $[(A)^2]$ per molecule of the anionic surfactant used, and Y is the absolute value of the specific surface area $(m^2/g)$ of the hydrotalcite.

According to this invention, there can be provided a thermoplastic resin composition containing hydrotalcite uncoated, or coated with an anionic surface active agent. For example, compositions having improved properties, especially those useful for melt shaping, can be provided by incorporating the coated or uncoated hydrotalcite in thermoplastic synthetic resins, especially hydrophobic and strongly non-polar synthetic resins, as a fire retardant in an amount of about 50 to about 150 – 200 parts by weight per 100 parts by weight of the resin. These compositions may be provided in the form of melt-shaped articles. Furthermore, by incorporating the coated or uncoated hydrotalcite in paints or lacquers in an amount of about 5 to about 150 parts by weight per 100 parts by weight of a resin vehicle therein, paint compositions having improved properties can be obtained.

Various conventional additives may further be incorporated in the thermoplastic resin compositions or paint compositions in accordance with this invention. Moreover, other known inorganic or organic fire retarding agents can also be used together in the compositions of this invention.

Examples of these additives include coloring agents (organic and inorganic pigments) such as isoindolinone, cobalt aluminate, carbon black or cadmium sulfide; other fillers such as calcium carbonate, alumina, zinc oxide or talc; anti-oxidants such as 2,6-di-t-butyl-4-methylphenol, 2,2'-methylene bis(4-methyl-6-t-butylphenol), dilauryl thiodipropionate or tridecyl phosphite; ultraviolet absorbers such as 2-hydroxy-4-methoxy benzophenone, 2-(2'-hydroxy-5-methylphenyl) benzotriazole, 2-ethoxyhexyl-2-cyano-3,3-diphenyl acrylate, phenyl salicylate or nickel-bis octyl phenyl sulfide; plasticizers such as di-2-ethylhexylphthalate, di-n-butyl phthalate, butyl stearate or epoxidized soybean oil; and lubricants, such as zinc stearate, calcium, aluminum and other metal soaps, or polyethylene wax. These additives are used in conventional amounts. For example, the amount of the coloring agent is about 0.1 to about 3 parts by weight; the amount of the other filler is up to about 20 parts by weight; the amount of the antioxidant or ultraviolet absorber is about 0.001 to about 5 parts by weight; the amount of the plasticizer is up to about 20 parts by weight; and the amount of the lubricant is up to about 10 parts by weight. All these amounts are based on 100 parts by weight of the thermoplastic synthetic resin.

The anionic surface active agent used to coat the hydrotalcite includes, for example, alkali metal salts of higher fatty acids of the formula

RCOOM wherein
R is an alkyl group containing 8 to 30 cabon atoms, and M is an alkali metal atom, alkyl sulfate salts of the formula $ROSO_3M$ wherein
R and M are as defined above, alkylsulfonate salts of the formula
$RSO_3M$ wherein
R and M are defined above, alkylarylsulfonate salts of the formula $R—aryl—SO_3M$ wherein R and M are as defined above, and sulfosuccinate ester salts of the formula $$\begin{array}{c} ROCOCH_2 \\ | \\ ROCOCHSO_3M \end{array}$$

wherein R and M are as defined above.

These anionic surfactants can be used either alone or in admixture of two or more.

Specific examples of the surface active agent are sodium stearate, potassium behenate, sodium montanate, potassium stearate, sodium oleate, potassium oleate, sodium palmitate, potassium palmitate, sodium laurate, potassium laurate, sodium dilaurylbenzenesulfonate, potassium octadecylsulfate, sodium laurylsulfonate, or disodium 2-sulfoethyl α-sulfostearate.

The hydrotalcites having a BET specific surface area of not more than 30 m²/g used in this invention can be prepared by hydrothermally treating the hydrotalcites obtained, for example, by the methods disclosed in Japanese Patent Publications Nos. 2280/71, 30039/75, 32198/72, 29477/73, and 29129/76 in an aqueous medium. For example, a hydrotalcite obtained by such a method is hydrothermally treated in an autoclave at a temperature of at least about 150° C., for example, about 150° to 300° C., for about 5 to 30 hours. In short, the requirement is that the hydrotalcite be treated with hot water under elevated pressures until its BET specific surface area and crystallite size in the direction of <003> attain the values specified in this invention. Higher temperatures in hydrothermal treatment result in hydrotalcites which better meet the above conditions, and high temperatures of, say, more than 250° C., may be employed. But the extent of improvement attained does not increase correspondingly. It is not necessary therefore to use excessively high temperatures, and temperatures of about 150° – 300° C., preferably about 150° – 250° C., are usually preferred.

The following Examples and Comparative Examples illustrate the present invention more specifically.

EXAMPLE 1

One kilogram of hydrotalcite having the composition formula $Mg_{2/3}Al_{1/3}(OH)_2(CO_3)_{1/6}1/2H_2O$ (a crystallite size in the direction of <003> of 280 A and a BET specific surface area of 62 m²/g) was placed in a 10-liter autoclave, and water was added to make the entire volume about 7 liters. The mixture was heated at 200° C. for 18 hours in the autoclave.

2 Kg of the treated hydrotalcite having a crystallite size in the direction of <003> of 2380 A and a BET specific surface area of 4 m²/g was thoroughly mixed with 2 kg of polystyrene (high-impact grade) by a Henschel mixer. The mixture was pelletized by passing it through an extruder while maintaining the resin at a temperature of about 250° C. The pellets were injection-molded, and the properties and fire retardancy of the molded article were evaluated by ASTM standards and UL standards. The results are shown in Table 1.

COMPARATIVE EXAMPLE 1

Example 1 was repeated except that hydrotalcite before hydrothermal treatment (with a BET specific surface area of 62 m²/g) was used instead of the hydrothermally treated hydrotalcite used in Example 1. The results are shown in Table 1.

COMPARATIVE EXAMPLE 2

The same polystyrene as used in Example 1 was injection-molded in the same way as in Example 1 except that the addition of the hydrotalcite was omitted. The results are shown in Table 1.

EXAMPLE 2 AND COMPARATIVE EXAMPLES 3 AND 4

Hydrotalcite having the composition formula $Mg_{0.75}Al_{0.25}(OH)_2(CO_3)_{1/8}\cdot 5/8H_2O$ (a crystallite size in the direction of <003> of 210 A and a BET specific surface area of 90 m²/g was hydrothermally treated at 170° C. for 14 hours in the autoclave to afford a hydrotalcite having a crystallite size in the direction <003> of 1650 A, and a BET specific surface area of 12 m²/g as a fire retardant in accordance with this invention. 3 Kg of the hydrotalcite was mixed with 3 kg of crystalline polypropylene having a melt index of 4.8 and a density of 0.91, and the mixture was pelletized by passing it through an extruder while maintaining the resin at a temperature of 240° C. The pellets were injection-molded. The same test as in Example 1 was carried out, and the results obtained are shown in Table 1.

For comparision, the above procedure was repeated except that the hydrotalcite before hydrothermal treatment was used (Comparative Example 3), and polypropylene alone was molded without using the hydrotalcite (Comparative Example 4).

The results are shown in Table 1.

EXAMPLE 3 AND COMPARATIVE EXAMPLES 5 AND 6

One kilogram of hydrotalcite having the composition formula $Mg_{0.8}Al_{0.2}(OH)_2(SO_4)_{0.1}\cdot 0.6H_2O$ (a crystallite size in the direction of <003> of 60 A and a BET specific surface area of 120 m²/g) and about 6 liters of water were heated in a 10-liter autoclave at 150° C. for 12 hours.

2 Kg of the resulting hydrotalcite having a crystallite size in the direction of <003> of 650 A and a BET specific surface area of 28 m²/g was thoroughly mixed with 1.8 kg of high density polyethylene having a melt index of 15.0 and a density of 0.97 by a Henschel mixer, and pelletized through an extruder while maintaining the resin at a temperature of 220° C. The pellets were injection-molded. The same test as in Example 1 was performed, and the results obtained are shown in Table 1.

For comparison, the above procedure was repeated except that the hydrotalcite not hydrothermally treated was used (Comparative Example 5), and the polyethylene alone was molded without using the hydrotalcite (Comparative Example 6).

The results are shown in Table 1.

EXAMPLES 4 TO 8

Example 1 was repeated except that each of the resins and the hydrotalcite [$Mg_{2/3}Al_{1/3}(OH)_2(CO_3)_{1/6} \cdot 1/2H_2O$] in the amounts indicated were used. The results are shown in Table 1.

BET specific surface area of 12 $m^2/g$ was poured at a time into 20 liters of an aqueous solution of sodium oleate in a concentration of 5 millimoles/liter at about 40° C. The mixture was stirred thoroughly for about 30 minutes to cause the sodium oleate molecules to be chemically adsorbed to the surface of the hydrotalcite crystals, followed by dehydration, washing with water, dehydration, and drying. The adsorption cross-sectional area of one molecule of sodium oleate was 46 (A)$^2$. Hence, the amount of sodium oleate required for monolayer adsorption was 43 millimoles/kg (12/6.02 × 46).

Thus, sodiuum oleate in an amount corresponding to 2.3 times (5 × 20/43) the monolayer thickness was contacted with the hydrotalcite in the above procedure.

120 Parts by weight of the hydrotalcite so treated and

Table 1

| Example (Ex.) or Comparative Example (CE.) | Thermoplastic resin | Hydrotalcite Amount (*5) | BET specific surface area (m²/g) | <003> Crystallite size (A) | Injection pressure (*1) | Izod Impact strength (kg-cm/cm) (*2) | Tensile elongation (%) (*3) | Fire retardancy (*4) | Appearance of the surface of molded article |
|---|---|---|---|---|---|---|---|---|---|
| Ex. 1 | Polystyrene | 150 | 4 | 2380 | 106 | 3.9 | 5.6 | V-0 | No flash, lustrous |
| CE. 1 | " | 150 | 62 | 280 | 188 | 0.8 | 1.5 | V-1 | Flash occurred |
| CE. 2 | " | — | — | — | 100 | 7.0 | 35.0 | Combustible | No flash, lustrous |
| Ex. 2 | Polypropylene | 150 | 12 | 1650 | 106 | 3.6 | 6.2 | V-0 | No flash, lustrous |
| CE. 3 | " | 150 | 90 | 210 | 210 | 1.2 | 2.5 | V-2 | Flash occurred, no luster |
| CE. 4 | " | — | — | — | 100 | 5.9 | 700 | Combustible | No flash, lustrous |
| Ex. 3 | Polyethylene | 90 | 28 | 650 | 106 | 3.1 | 7.0 | V-2 | No flash, lustrous |
| CE. 5 | " | 90 | 120 | 60 | 240 | 1.1 | 2.7 | HB | Flash occurred, luster weak |
| CE. 6 | " | — | — | — | 100 | 8.0 | 500 | Combustible | Flash occurred, no luster |
| Ex. 4 | Ethylene-propylene copolymer | 150 | 18 | 1020 | 125 | 1.0 | 2.0 | V-0 | No flash, lustrous |
| Ex. 5 | ABS resin | 120 | 15 | 1150 | 110 | 2.5 | 0.8 | V-2 | No flash |
| Ex. 6 | Nylon 6 | 150 | 10 | 1700 | 112 | 3.6 | 3.6 | V-0 | Slight flash |
| Ex. 7 | Polycarbonate | 120 | 8 | 2010 | 108 | 3.5 | 5.2 | V-1 | Slight flash |
| Ex. 8 | Polyester | 120 | 15 | 1150 | 108 | 3.7 | 7.0 | V-1 | Slight flash |

Footnote to Table 1
(*1) The relative value of the injecting pressure to that used for molding the resin alone.
(*2) By ASTM D256 (notched)
(*3) By ASTM D638
(*4) By UL Standards 94VE
(*5) Parts by weight per 100 parts by weight of the resin.

EXAMPLES 9 TO 12

One kilogram of hydrotalcite having the composition formula $Mg_{2/3}Al_{1/3}(OH)_2(CO_3)_{1/6} \cdot 1/2H_2O$ and having a 100 parts by weight of polypropylene were melt-kneaded, and molded. The properties of the molded articles were evaluated, and the results are shown in Table 2.

Table 2

| Example (Ex.) or Comparative Example (CE.) | Thermoplastic resin | Hydrotalcite Amount (*5) | BET specific surface area (m²/g) | <003> Crystallite size (A) | Surfactant | Thickness of coated layer (times the monolayer) (*6) | Injection pressure (*1) | Izod impact strength (kg-cm/cm) (*2) | Tensile elongation (%) (*3) | Fire retardancy (*4) | Appearance of the surface of molded article |
|---|---|---|---|---|---|---|---|---|---|---|---|
| Ex. 9 | Polypropylene | 120 | 12 | 1650 | Sodium oleate | 2.3 | 80 | 4.2 | 25.0 | V-1 or V-2 | No flash, more lustrous than the base resin |
| Ex. 10 | " | 150 | 6 | 2100 | " | 1.7 | 75 | 3.0 | 18.0 | V-0 | No flash, more lustrous than the base resin |
| Ex. 11 | High density polyethylene | 120 | 10 | 1700 | Sodium stearate | 1.5 | 70 | 3.8 | 12.5 | V-0 | No flash, more lustrous than the base resin |
| Ex. 12 | Polypropylene | 150 | 8 | 2010 | Sodium lauryl benzene- | 2.0 | 98 | 2.1 | 12.5 | V-0 | No flash, more lustrous than the base resin |

Table 2-continued

| | | Hydrotalcite | | | | | | | | |
|---|---|---|---|---|---|---|---|---|---|---|
| Example (Ex.) or Comparative Example (CE.) | Thermoplastic resin | Amount (*5) | BET specific surface area (m²/g) | <003> Crystallite size (A) | Surfactant | Thickness of coated layer (times the monolayer) (*6) | Injection pressure (*1) | Izod impact strength (kg-cm/cm) (*2) | Tensile elongation (%) (*3) | Fire retardancy (*4) | Appearance of the surface of molded article |
| | | | | | sulfonate | | | | | | |

(*1) to (*5) are the same as the footnotes to Table 1.
(*6) Times the amount X (millimoles) defined in the specification.

What we claim is:
1. A fire-retarding thermoplastic resin composition comprising
   A. a thermoplastic resin, and
   B. a fire-retarding amount of a hydrotalcite having a specific surface area, determined by the BET method, of not more than 30 m²/g, the hydrotalcite being uncoated, or coated with an aqueous solution of an anionic surface active agent in a concentration of not more than 20 millimoles/liter in a thickness larger than a monolayer but up to a triple layer.
2. The composition of claim 1 wherein the amount of the hydrotalcite is about 50 to about 200 parts by weight per 100 parts by weight of the thermoplastic resin.
3. The composition of claim 1 wherein the hydrotalcite has a crystallite size, in the <003> direction in an X-ray diffraction pattern, of at least 600 A.
4. The composition of claim 3 wherein the hydrotalcite has a specific surface area, determined by the BET method, of not more than 20 m²/g.
5. The composition of claim 3 wherein the hydrotalcite has a crystallite size, in the <003> direction in an X-ray diffraction pattern, of at least 1,000 A.
6. The composition of claim 1 wherein the thermoplastic resin is selected from the group consisting of polymers and copolymers of α-olefins, polystyrene resins, ABS resin, polyester resins, polyamide resins, polycarbonate resins, and mixtures of these.
7. The composition of claim 1 wherein the hydrotalcite is a compound expressed by the following formula

$$Mg_{1-x}Al_x(OH)_2 \cdot A_{x/n}^{n-} \cdot mH_2O$$

wherein $X$ is a number of more than 0 but up to 0.5, $A^{n-}$ represents an anion having a valence of $n$, and $m$ is a positive number.

8. The composition of claim 1 wherein the anionic surface active agent is selected from the group consisting of alkali metal salts of higher fatty acids of the formula $$RCOOM$$

wherein $R$ is an alkyl group containing 8 to 30 carbon atoms, and $M$ is an alkali metal atom, alkyl sulfate salts of the formula $$ROSO_3M$$

wherein $R$ and $M$ are as defined above, alkylsulfonate salts of the formula $$RSO_3M$$

wherein $R$ and $M$ are as defined above, alkylarylsulfonate salts of the formula $$R-aryl-SO_3M$$

wherein $R$ and $M$ are as defined above, and sulfosuccinate ester salts of the formula $$\begin{array}{l} ROCOCH_2 \\ | \\ ROCOCHSO_3M \end{array}$$

wherein $R$ and $M$ are as defined above.

* * * * *